(12) United States Patent
Haulk et al.

(10) Patent No.: US 7,340,412 B2
(45) Date of Patent: Mar. 4, 2008

(54) METHODS AND APPARATUS FOR PERFORMING DELTA UPDATES OF AN ELECTRONIC SHELF LABEL

(75) Inventors: Kevin W. Haulk, Griffin, GA (US); Cheryl K. Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 1117 days.

(21) Appl. No.: 10/044,021

(22) Filed: Jan. 11, 2002

(65) Prior Publication Data

US 2003/0135419 A1    Jul. 17, 2003

(51) Int. Cl.
*G06Q 20/00* (2006.01)
(52) U.S. Cl. ...................................................... 705/20
(58) Field of Classification Search ................ 705/20, 705/21, 22; 235/383
See application file for complete search history.

(56) References Cited

U.S. PATENT DOCUMENTS

| | | | | |
|---|---|---|---|---|
| 4,962,466 A | * | 10/1990 | Revesz et al. | 705/14 |
| 5,704,049 A | * | 12/1997 | Briechle | 715/744 |
| 6,269,342 B1 | * | 7/2001 | Brick et al. | 705/20 |
| 6,292,595 B1 | * | 9/2001 | Petteruti et al. | 382/313 |
| 6,626,359 B2 | * | 9/2003 | Haulk et al. | 235/383 |
| 6,715,675 B1 | * | 4/2004 | Rosenfeld | 235/383 |
| 6,762,674 B2 | * | 7/2004 | Matsushita | 340/5.91 |
| 2001/0028300 A1 | * | 10/2001 | Matsushita | 340/5.91 |

* cited by examiner

*Primary Examiner*—Ronald Laneau
(74) *Attorney, Agent, or Firm*—Priest & Goldstein PLLC; Paul W. Martin

(57) ABSTRACT

An electronic price label (ESL) system providing a delta update of an ESL's registers. In one aspect, an ESL manager receives and indication that an update to one or more of the registers of the ESL may be necessary. The ESL manager sends a data request to a data reader to provide a data reader image to the ESL manager. The data reader image contains a complete listing of the intended or planned contents of all the ESL's registers, some of which may require an update. The ESL manager reads a copy of an ESL data image from an ESL table which includes the current contents of all the ESL's registers. The ESL manager compares the data reader image with the ESL data image to determine an update data image which includes a subset of only those fields which have different content in the data reader image and the ESL data image. The ESL manager sends the update data image to a CBS manager which then transmits one or more messages to the ESL, causing the subset of the ESL's registers to be loaded with the updated content.

9 Claims, 5 Drawing Sheets

FIG. 3

| REG. NO. | REGISTER DATA | SEQUENCE REG. 1 | SEQUENCE REG. 2 | SEQUENCE REG. 3 | SEQUENCE REG. 4 | GROUP MASK |
|---|---|---|---|---|---|---|
| 1 | 2.50  .67 | 10 | 0 | 0 | 0 | 1 |
| 2 | 1.99  .50 | 0 | 10 | 0 | 0 | 1 |
| 3 |  | 0 | 0 | 0 | 0 | 1 |
| 4 |  | 0 | 0 | 0 | 0 | 1 |
| 5 | YOU SAVE | 0 | 5 | 0 | 0 | 1 |
| 6 | 0.51 | 0 | 5 | 0 | 0 | 1 |
| 7 | WITH CARD | 0 | 5 | 0 | 0 | 1 |
| 8 | BUY TODAY | 3 | 0 | 0 | 0 | 1 |
| 9 |  | 0 | 0 | 0 | 0 | 1 |
| 10 |  | 0 | 0 | 0 | 0 | 0 |
| 11 |  | 0 | 0 | 0 | 0 | 1 |
| 12 |  | 0 | 0 | 0 | 0 | 1 |
| 13 |  | 0 | 0 | 0 | 0 | 0 |
| 14 | STOCK 153 | 0 | 0 | 255 | 6 | 1 |
| 15 | BIB TODAY | 0 | 0 | 0 | 6 | 1 |
| 16 | UPDATING | 0 | 0 | 0 | 0 | 1 |

| CURRENT ACTIVE SEQUENCE | CURRENT BUTTON SEQUENCE |
|---|---|
| 1 | 4 |

| BUTTON ENABLED |
|---|
| 1 |

| GROUP REGISTER | ID |
|---|---|
| 1 | 15 |
| 2 | 25 |
| 3 | 101 |
| 4 | 500 |

| SCHEDULED SEQUENCE NUMBER | SCHEDULED SEQUENCE ENABLED | SCHEDULED SEQUENCE TIME | SCHEDULED SEQUENCE | SCHEDULED SEQUENCE DISPLAY |
|---|---|---|---|---|
| 1 | 1 | 2001-08-31  15:00:00 | 2 | 1 |
| 2 | 0 | -- | -- | -- |
| 3 | 1 | 2001-08-30  23:00:00 | 4 | 0 |
| 4 | 0 | -- | -- | -- |

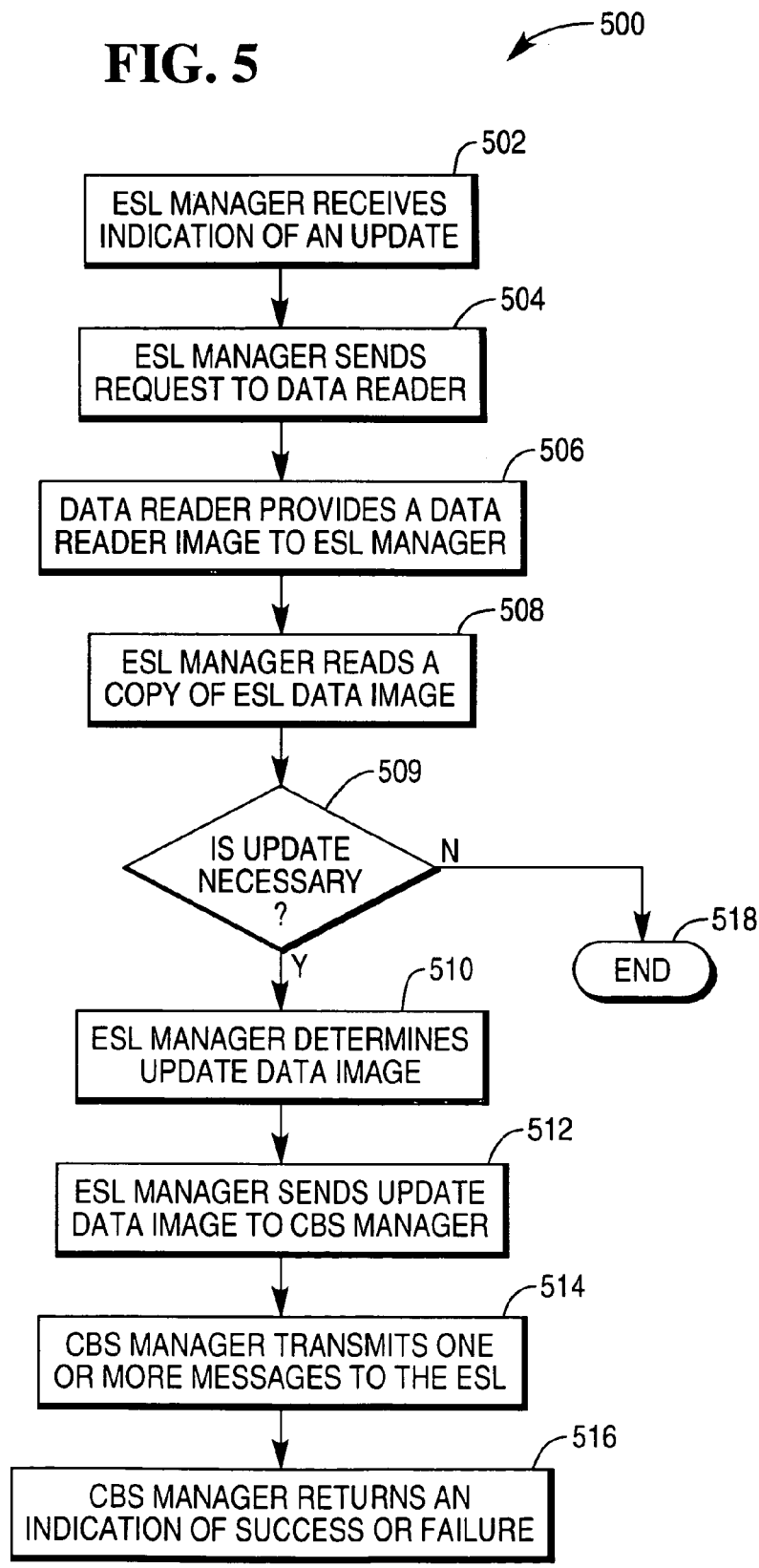

METHODS AND APPARATUS FOR PERFORMING DELTA UPDATES OF AN ELECTRONIC SHELF LABEL

FIELD OF THE INVENTION

The present invention relates generally to improvements in electronic shelf label (ESL) systems used in transaction establishments. More specifically, the present invention relates to improved methods and apparatus for performing delta updates of an ESL's registers which updates registers which are scheduled to store new or updated information.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. The central server sends messages, including register update messages, to the ESLs.

While prior ESL systems provide many of the capabilities required by retailers, these systems may suffer from various disadvantages. For example, when an update of an ESL's registers was required, a prior ESL system would typically transmit an update all of the ESL's registers, even if only a portion of the registers needed to have new data written to them. Such a full data update of all of the ESL's registers can take a significant amount of time to transmit and process, impacting overall system performance when a large number of ESLs are being updated. Therefore, it would be desirable to provide an ESL system and method that provides for a delta update technique which only updates registers which are scheduled to store new or updated information.

SUMMARY OF THE INVENTION

The present invention advantageously provides methods and apparatus for an improved electronic shelf label (ESL) system. In one aspect, the present invention includes an ESL for displaying information relating to an item associated with the ESL. The ESL includes a plurality of registers for storing information controlling the content and formatting of the information displayed. A host computer system includes an ESL data file comprising a data image of the current contents of the ESL's registers or memory. To perform a delta update, an ESL manager receives an indication that an update to one or more of the registers of the ESL may be necessary. The ESL manager sends a data request to a data reader to provide a data reader image to the ESL manager. The data reader image contains a full listing of the planned or intended contents of all the ESL's registers, some of which may require an update. The ESL manager reads a copy of an ESL data image from an ESL table which includes the current contents of all the ESL's registers. The ESL manager compares the data reader image with the ESL data image to determine a delta, or update, data image which includes only those fields which have different content in the data reader image from that in the ESL data image. The ESL manager sends the update data image to a CBS manager which then transmits one or more messages to the ESL, causing only the identified subset of the ESL's registers with changed data to be loaded with the updated content, allowing the ESL to be updated in a more efficient fashion utilizing less system bandwidth.

A more complete understanding of the present invention, as well as further features and advantages of the invention, will be apparent from the following detailed description and the accompanying drawings.

BRIEF DESCRIPTION OF THE DRAWINGS

FIG. 3 shows an exemplary ESL register map in accordance with the present invention;

FIG. 5 shows a method of performing a delta update in accordance with the present invention.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of an ESL system suitable for use in conjunction with the present invention are found in U.S. patent application Ser. No. 10/044610 filed Jan. 11, 2001 entitled "Methods and Apparatus for Intelligent Data Bedcheck of an Electronic Shelf Label", U.S. patent application Ser. No. 10/044020 filed Jan. 11, 2001 entitled "Methods and Apparatus for Reduced Electronic Shelf Label Power Consumption", U.S. patent application Ser. No. 10/044535 filed Jan. 11, 2001 entitled "Methods and Apparatus for Error Detection and Correction of an Electronic Shelf Label System Communication Error", U.S. patent application Ser. No. 10/44439 filed Jan. 11, 2001 entitled "Methods and Apparatus for Automatically Locating an Electronic Shelf Label", U.S. patent application Ser. No. 10/044440 filed Jan. 11, 2001 entitled "Methods and Apparatus for Conserving Battery Power in an Electronic Shelf Label System", U.S. patent application Ser. No. 10/044688 filed Jan. 11, 2001 entitled "Methods and Apparatus for Automatic Assignment of a Communication Base Station and Timeslot for an Electronic Shelf Label", U.S. patent application Ser. No.10/04487 filed Jan. 11, 2001 entitled "Methods and Apparatus for Error Detection and Correction in an Electronic Shelf Label System", all of which are assigned to the assignee of the present invention and incorporated by reference herein in their entirety.

Figure 1:
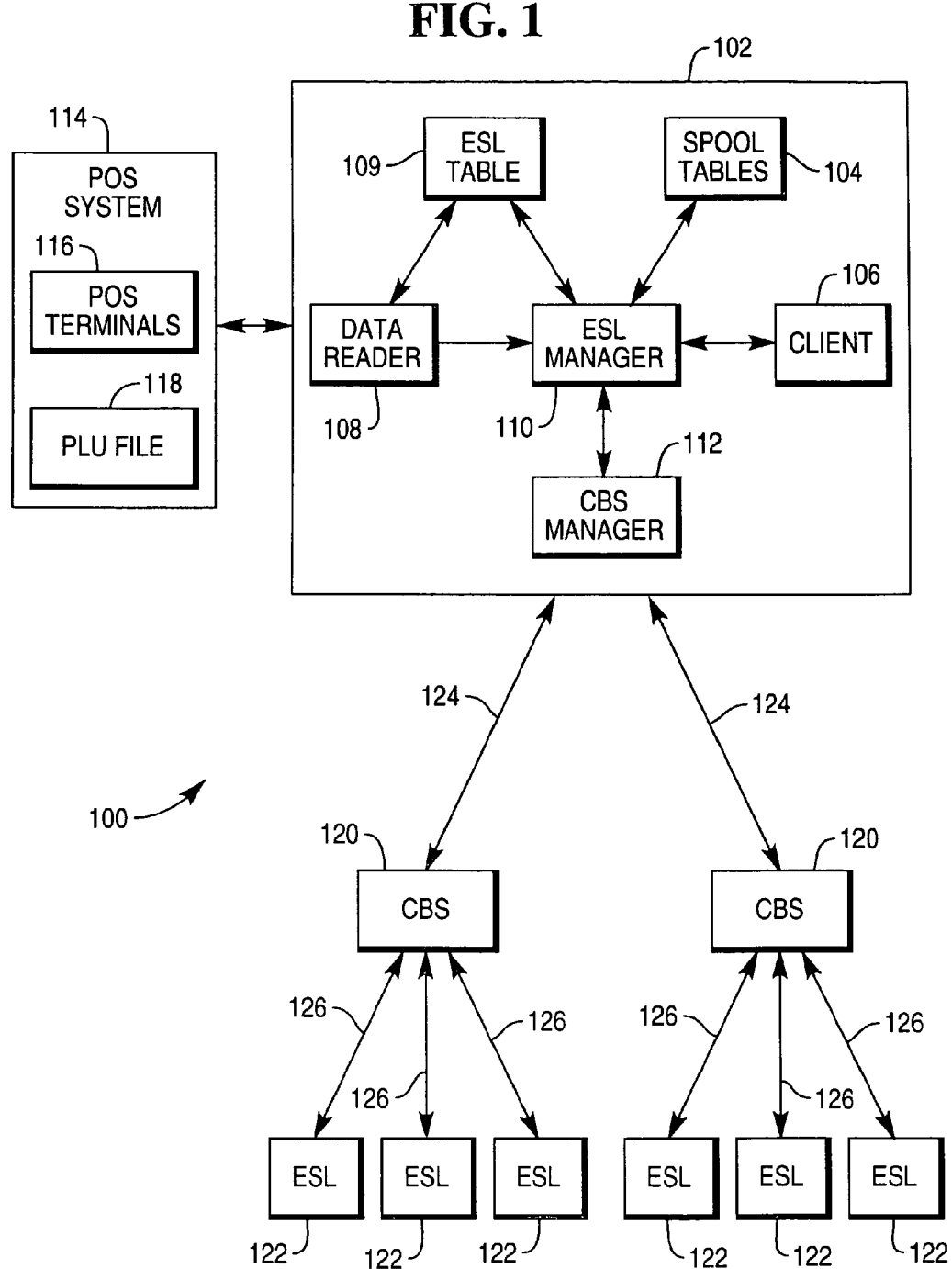
FIG. 1 shows a block diagram of a transaction management system in accordance with the present invention.

FIG. 1 shows a transaction management system 100 in accordance with the present invention. The system 100 includes an ESL computer system 102 and a point-of-sale (POS) system 114. Here, components 102 and 114 are shown as separate components that are networked together, but they and their subcomponents may also be combined or divided in various ways.

The host computer system 102 includes an ESL table 109, spool tables 104, data reader 108, ESL manager 110, a client application 106 and a communication base station (CBS)

manager 112. POS system 114 includes a price look-up (PLU) file 118 and POS terminals 116.

The system 100 also includes CBSs 120 and ESLs 122. The CBSs 120 maybe suitably mounted in or near the ceiling of the retail establishment. ESLs 122 are typically attached to store shelving adjacent to items. In one aspect, the system 100 includes a plurality of groups of ESLs 122 and a plurality of CBSs 120, with each group of ESLs 122 preferably assigned to one the CBSs 120. A record of this assignment relationship is stored in system memory, for example, as part of the data stored in the ESL data file 109.

The ESL manager 110 records and schedules messages to the ESLs 122. The ESL manager 110 monitors and maintains an action list for the ESLs 122 utilizing spool tables 104, and provides a scheduling function for time related events which need to occur at a future point in time. Items on the action list may be provided from client components as requests for work, may be automatically generated by the ESL manager 110, or could be due to requests that required additional processing at a later date, such as, for example, a series of sale prices to be displayed at the ESLs at given times. Based on the events the ESL manager 110 has scheduled for an ESL 122, the ESL manager 110 creates the appropriate request and sends the request to the CBS manager 112. The requests may include register or memory updates of an ESL 122, diagnostic requests such as bedchecks, location requests such as finds, assignments to a particular timeslot, and the like. Based on the response returned from the ESL 122 via the CBS manager 112, the ESL manager 110 then updates the ESL table 109 and spool tables 104 as appropriate. Such updates may include marking a particular task as completed, updating the data image of the ESL 122, and the like. A client application, such as client application 106, may interface with the ESL manager 110 to initiate requests for a particular activity. The data reader 108 provides an interface from the ESL manager 110 to the POS system 114.

The CBS manager 112 is responsible for all communications, processing, and monitoring of the CBSs. The CBS manager 112 receives information intended to be transmitted to the ESLs 122 and processes it into a form appropriate for use by the CBSs 120 and ESLs 122. The CBS manager 112 processes the response of a particular ESL 122 after a CBS 120 has received that response and then passed that response to the CBS manager 112. Additionally, the CBS manager 112 monitors the CBSs 120 for problems, performs diagnostics on the CBSs 120 and logs errors.

The messages are sent to the CBSs 120 through communication links 124. The communication links 124 may suitably utilize radio frequency (RF) communication, infrared (IR) communication, a wired link, or some combination of communication techniques. Groups of ESLs 122 are assigned to a particular CBS for communication. After receiving a message from the host system 102, a particular CBS 120 which has been assigned to an ESL 122 then transmits the message to the ESL 122 utilizing communication link 126, which may suitably utilize RF communication, IR communication, or some combination of communication techniques.

After receiving messages, the ESLs 122 transmit responses to CBSs 120 over communication links 126. The CBSs 120 then process and retransmit the response messages to the CBS manager 112 over communication links 124. The CBSs 120 may also detect the signal strength of the responses and report the signal strengths to the host computer system 102.

The ESL data file 109 consists of multiple records, with each record corresponding to a particular ESL 122 in a retail establishment. The record for each ESL 122 includes a number of fields, with each field containing the data which is supposed or assumed to be in one of the registers of the ESL 122. Thus, the record contains a picture, or full data image, of what data is intended to be stored in the ESL 122, and consequently, what the ESL 122 should be displaying on the ESL's display. Additionally, each record may include a variety of additional non-display information related to the ESL 122, such as the timeslot the ESL 122 listens on, the CBS 120 assigned to the ESL 122, and the PLU number of the item associated with the ESL 122. The record may also contain diagnostic and tally information related to that ESL 122, such as when the last time a message was sent to the ESL 122, the last time the ESL 122 had a data bedcheck, a count of how many times the ESL 122 has failed its data bedcheck, and the like.

Figure 2:
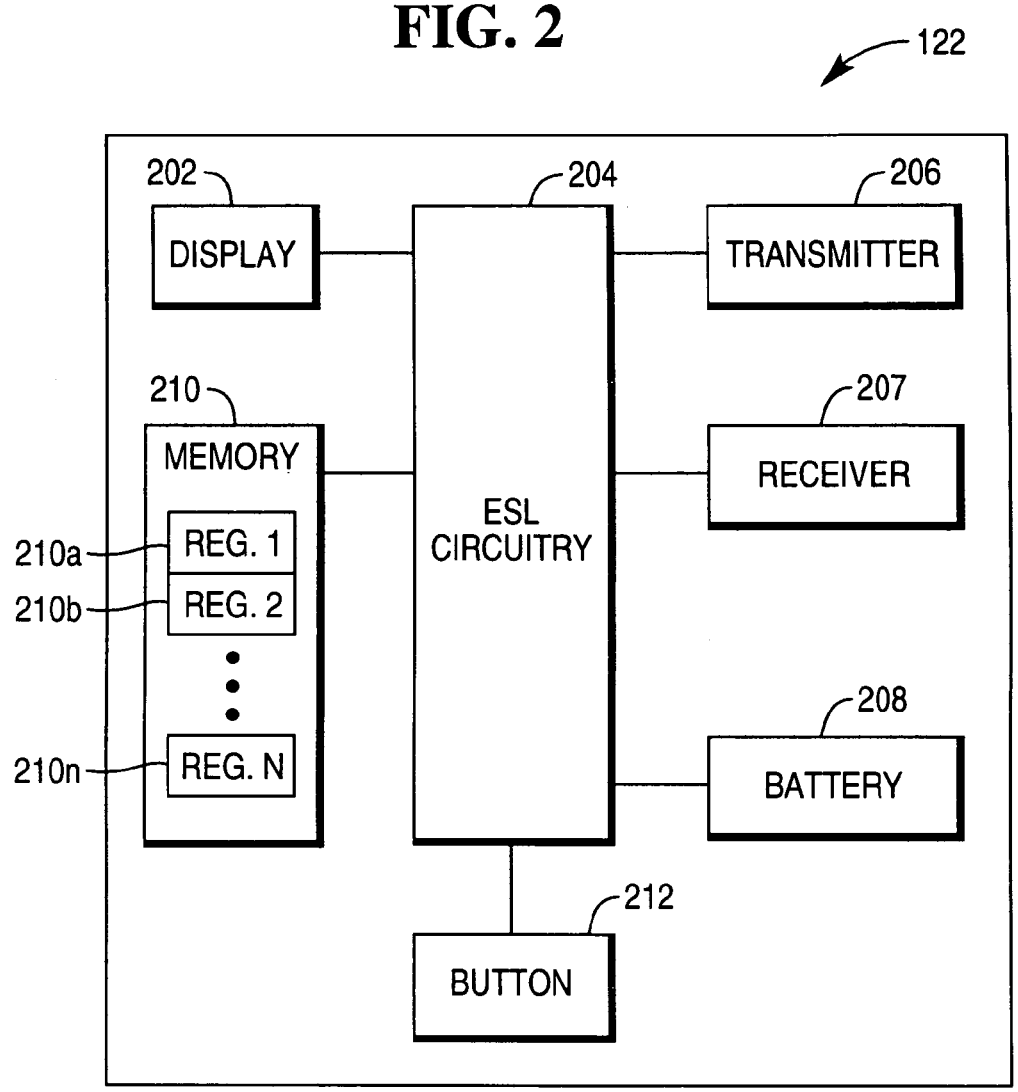
FIG. 2 is a block diagram of an ESL in accordance with the present invention.

FIG. 2 shows a block diagram of an exemplary ESL 122 in accordance with the present invention. A display 202 displays information, such as item price and related data. ESL 122 includes a transmitter 206 for transmitting messages and a receiver 207 for receiving messages. The transmitter 206 and receiver 207 may utilize RF communication, IR communication, a wired link or some combination of communication techniques. A battery 208 provides power for the operation of ESL 122. The operation of ESL 122 is controlled by ESL circuitry 204. ESL circuitry 204 decodes incoming messages received, and performs any actions indicated by the messages. For example, if a register update message is received, the ESL circuitry 204 would cause the appropriate register to be updated with the data. ESL memory 210 includes a plurality of registers, such as registers $210a$, $210b$, ..., $210n$. The ESL memory 210 may contain many types of information. For example, the memory 210 may include display registers which contain the actual text to be displayed by the ESL 122. This text may include item price, informative or promotional text, text directed to store employees, and the like. Other registers may contain data which controls various parameters related to the display of the text, such as display register selection and timing sequences, for example. The ESL 122 may also include a button 212 which may be depressed to initiate a particular function, such as, for example, the display of an alternate message.

As described above, each ESL 122 is preferably associated with a particular CBS 120 which transmits messages to the ESL 122 and listens for responses. Each CBS 120 in a retail establishment transmits messages to and receives responses from groups of ESLs 122 assigned to the particular CBS 120. In a preferred embodiment, communication between the CBSs 120 and the ESLs 122 is divided into frames, with each frame being 1.45 seconds. Each frame is further divided into 24 timeslots, with each timeslot being 60.42 milliseconds. In addition to being associated with a particular CBS 120, each ESL 122 is associated with a particular timeslot and listens for messages and transmits responses during that timeslot only. Each CBS 120 may suitably support two timeslots for the transmission and reception of messages during normal operation.

FIG. 3 shows an exemplary ESL register map 300 of the registers of an ESL 122 in accordance with the present invention. The ESL 122 may include sixteen display registers $302_1$, $302_2$, ..., $302_{16}$ which contain the text or information to be displayed by the ESL 122. This display data may include a price or prices, some information text or promotional text, and possibly some text for in-store use, such as when to stock, what product to stock, and the like. The registers 302 may also store text that is not actually being displayed at any given time. How the text is displayed is controlled by other registers, as described in greater detail below.

The ESL 122 may also include four sequence registers 304, 306, 308, 310, with each sequence register storing sixteen numbers. The stored sixteen numbers in each sequence register correspond to the sixteen data registers. Each of the sixteen numbers may range from 0-255 and indicates how long the text in the corresponding register is to be displayed. A zero in one of the slots in the sequence register indicates that the corresponding text does not display. A 255 in the slot indicates that the text should display for 59.7 seconds, or approximately 1 minute. Numbers in between 0-255 indicate proportional times between 0 and 1 minute. Thus, as seen in the example shown in FIG. 3, the first sequence register 304 forces the contents of the first display register $302_1$ to display for 10 cycles, or about 2.3 seconds, and the contents of the eighth display register $302_8$ to display for 3 cycles, or about 0.7 seconds, with the contents of the remaining display registers 302 not being displayed. Thus, the ESL 122 displays "2.50 .67" for about 2.3 seconds and then displays "BUY TODAY" for about 0.7 seconds. This cycle between the first display register $302_1$ and the eighth display register $302_8$ repeats, encouraging the customer to purchase the product, and informing the customer that the total cost of the item is $2.50 and that the unit price is $0.67.

At any particular time, a current active sequence register 312 indicates which one of the four sequence registers controls the text displayed by the ESL 122. In the example shown in FIG. 3, the current active sequence register 312 contains a "1", indicating that the first sequence register 304 will be utilized, and information will displayed as detailed above. If a message transmitted to the ESL 122 writes the current active sequence register 312 to "2", then the text displayed will be controlled by the second sequence register 306. The second sequence register 306 will then force the contents of the second display register $302_2$ to display for 10 cycles, or about 2.3 seconds, the contents of the fifth display register $302_5$ to display for 5 cycles, or about 1.17 seconds, the contents of the sixth display register $302_6$ to display for 5 cycles, and the contents of the seventh display register $302_7$ to display for 5 cycles, with the contents of the remaining display registers 302 not being displayed. Thus, the ESL 122 displays "1.99 0.50" for about 2.3 seconds, "YOU SAVE" for about 1.17 seconds, "0.51" for 1.17 seconds, and "WITH CARD" for 1.17 seconds, with the cycle repeating. Thus, a customer sees a sequence of "1.99 0.50", "YOU SAVE", "0.51" and "WITH CARD", informing the customer that the total cost of the item is $2.50 and the unit price is $0.67, and encouraging the customer to save $0.51 by using a frequent shopper card to purchase the item.

One embodiment of an ESL 122 may include a button which, when depressed, temporarily changes the currently displayed sequence. The button may be disabled or enabled using the contents of button enabled register 316, with a "1" enabling the button and a "0" disabling the button. If the button is enabled, the current button sequence register 314 determines which sequence register is used to control the display while the button is depressed. In the example shown in FIG. 3, the current button sequence register 314 is loaded with a "4", indicating that the fourth sequence register 310 will control the display of information while the button is depressed.

The ESL 122 may include four group registers 318, 320, 322, 324. Each group register can contain an identification number which allows ESLs 122 to be addressed by the group the ESLs 122 belong to rather than individually. For example, group register 318 may be used to store a department number, such as the dairy department, allowing a single broadcast to affect all the ESLs in the dairy department.

The ESL 122 may also include four scheduled sequence registers 326, 328, 330, 332 which may be used to override the current active sequence. These registers may be loaded in advance and then will be automatically activated at the appropriate time. For example, the first scheduled sequence register 326 is enabled to switch the current active sequence on Aug. 31, 2001 at 3:00 PM (or 15:00:00) to the second sequence register 306 for the current display sequence. Thus, in scheduled sequence register 326, register element 326a is loaded with a "2", indicating the second sequence register 306 should be used for the new sequence, and register element 326b is loaded with a "1", indicating that the sequence affected is the current active sequence. As another example, the scheduled sequence register 330 is enabled to switch the current active sequence on Aug. 30, 2001 at 11:00 PM (or 23:00:00) to the fourth sequence register 310 for the button display sequence. Thus, in scheduled sequence register 330, register element 330a is loaded with a "4", indicating the fourth sequence register 310. Register element 330b is loaded with a "0", indicating that the sequence affected is the button sequence. The scheduled sequence registers 328 and 332 are both disabled in the example shown in FIG. 3.

The ESL 122 further includes a group mask register 334 comprising a series of sixteen bits corresponding to the sixteen registers 302 on the ESL 122. A "1" in the group mask for a particular register indicates that the register 302 should be displayed provided the associated sequence register contains a non-zero number. A "0" in the group mask for a particular register 302 indicates that the register 302 is not displayed even if the associated sequence register has a non-zero number in it. In other words, a "0" in the group mask overrides any setting in a sequence register which indicates that the contents of a register should be displayed.

Figure 4:
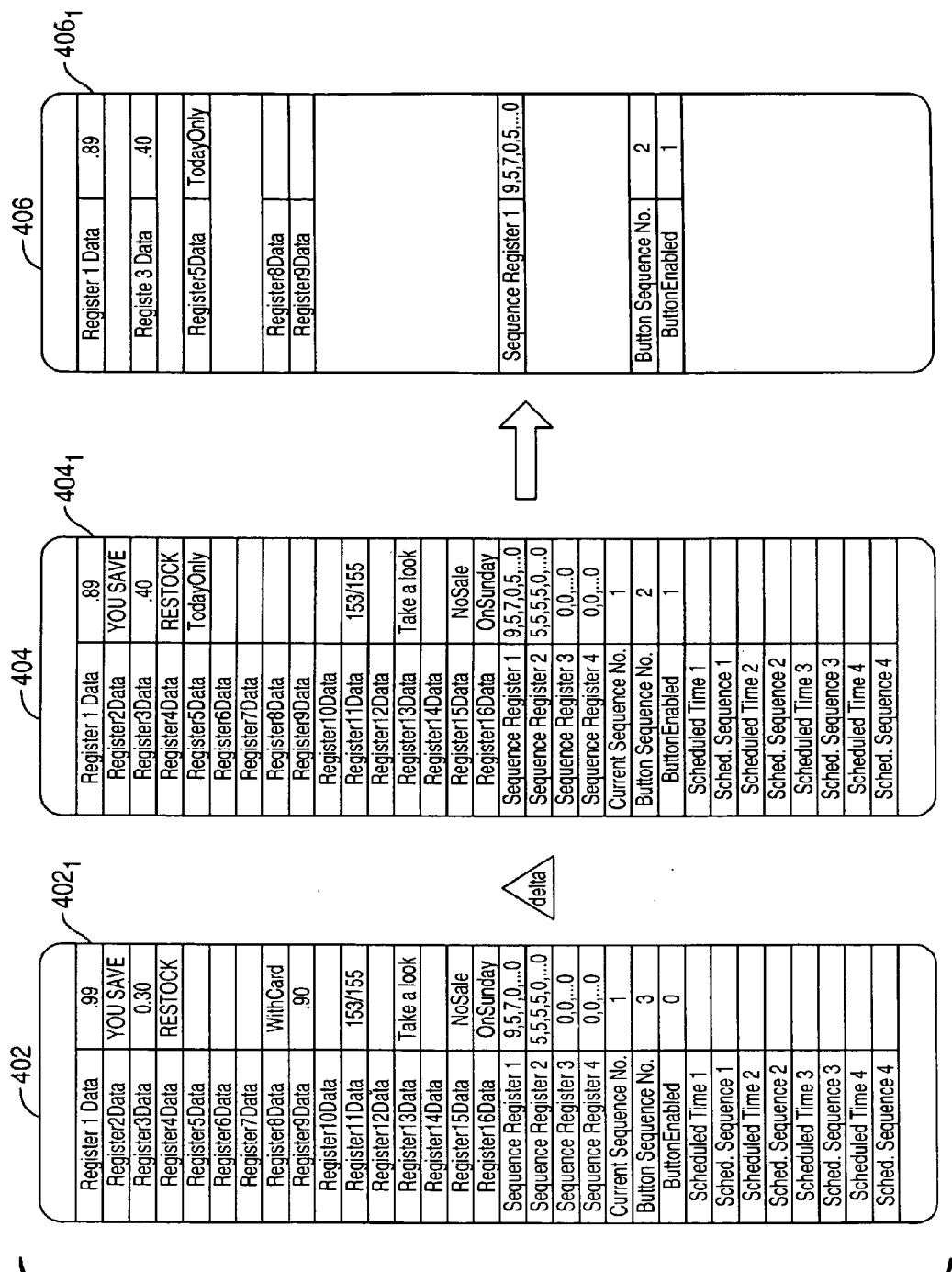
FIG. 4 shows ESL data images in accordance with the present invention.

Occasionally, the data in a portion of an ESL's registers need to be updated due to a price change, special promotion, advertisement change or the like. As described above, the ESL manager 110 is responsible for the management of the ESLs 122. During the course of normal operation, the ESL manager 110 receives an indication that an update to one or more of the registers of an ESL 122 may be necessary. The indication may originate from the client 106, such as an application used by a retail establishment to update ESLs, or some other application which communicates with the ESL manager 110. To acquire the new data to be written to an ESL 122, the ESL manager 110 sends a request to the data reader 108. The data reader 108 provides a data reader image, such as data reader image 404 shown in FIG. 4, which contains an image or a listing of the intended or planned contents of the ESL's registers including any updates. The ESL manager 110 then reads a copy of an ESL data image, such as ESL data image 402 shown in FIG. 4, which contains a listing of the current contents of the ESL's registers. The ESL manager 110 then compares the ESL image 402 with the data reader image 404 to determine an update data image, such as update data image 406 shown in FIG. 4. The update data image 406 only includes fields which contain different contents in the ESL image 402 and the data reader image 404. For example, as seen in FIG. 4, the current ESL image 402 includes the text "0.99" in field $402_1$ (currently stored in display register $302_1$) and the data reader image 404 includes the text "0.89" in field 404₁ which is to be the new contents of the display register 302₁.

Thus, the update data image 406 created by the ESL manager 110 includes the text "0.89". After the update data image 406 has been created, the ESL manager 110 sends the update data image 406 to the CBS manager 112, which then performs an update of the ESL's registers which need to be updated and returns an indication to the ESL manager of the success or failure of the update. In one aspect of the present invention, if the ESL manager determines the ESL data image matches the data reader image, an update data image is not sent to the CBS manager.

FIG. 5 shows a method 500 for performing a delta update of an ESL's registers in accordance with the present invention. In step 502, a host computer which includes an ESL manager receives an indication that an update to one or more of the registers of an ESL may be necessary. In step 504, the ESL manager sends a data request to a data reader. In step 506, the data reader provides a data reader image to the ESL manager. The data reader image contains a listing of the planned contents of the ESL's registers including any updates to the registers. In step 508, the ESL manager reads a copy of an ESL data image from an ESL table which includes the current contents of the ESL's registers. In step 509, the ESL manager compares the data reader image with the data reader image to determine if an update is necessary. If the ESL data image matches the data reader image, the method continues to step 518 and ends. If an update is necessary, the method continues to step 510. In step 510, the ESL manager determines an update data image which includes a subset of only those fields which have different content in the data reader image and the ESL data image. In step 512, the ESL manager sends the update data image to a CBS manager. In step 514, the CBS manager transmits one or more messages to the ESL, causing the subset of the ESL's registers to be loaded with the updated content. In step 516, the CBS manager returns an indication to the ESL manager of the success or failure of the update.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents. For example, while a presently preferred embodiment utilizes an ESL to display informational text or price of an associated item, an ESL system may utilize ESLs in a variety of applications and environments without departing from the spirit and scope of the present invention.

We claim:

1. A computerized method of performing a delta update of an electronic shelf label (ESL) comprising:
   (a) comparing a first data image including a first table of a plurality of registers of said ESL and current contents of said registers with a second data image including a second table of said registers and planned contents of said registers to determine a number of said registers less than all of said registers whose planned contents are different than corresponding current contents;
   (b) creating a third data image including a third table with only said number of registers and corresponding planned contents by the ESL manager program;
   (c) sending the third data image to a CBS manager program; and
   (d) scheduling a message for transmission to the ESL updating only the number of said registers to include corresponding planned contents from the third data image by the CBS manager program.

2. The method of claim 1 further comprising:
   (c) receiving an indication that an update to one or more of said registers may be necessary prior to step (a).

3. The method of claim 1, further comprising:
   (c) reading the first data image from a source of current ESL data.

4. The method of claim 1, further comprising:
   (c) reading the second data image from a source of product data.

5. A computerized method of performing a delta update of an electronic shelf label (ESL) comprising:
   (a) receiving an indication to perform an update of a plurality of registers of said ESL by an ESL manager program;
   (b) reading a first data image including a first table of said registers and current contents of said registers from current ESIJ data by the ESL manager program;
   (c) obtaining a second data image including a second table of said registers and planned contents of said registers from product data using a data reader program by the ESL manager program;
   (d) comparing the first data image with the second data image to determine a number of said registers less than all of said registers whose planned contents are different than corresponding current contents by the ESL manager program;
   (e) creating a third data image including a third table with only said number of registers and the corresponding planned contents by the ESL manager program; and
   (f) sending the third data image to a CBS manager program for transmission to the ESL by the ESL manager program.

6. An electronic shelf label (ESL) system comprising:
   an ESL including a plurality of registers and a display for displaying information; and
   a host computer for comparing a first data image including a first table of said registers and current contents of said registers with a second data image including a second table of said registers and planned contents of said registers to determine a number of said registers less than all of said registers whose planned contents are different than corresponding current contents, for creating a third data image including a third table with only said number of registers and corresponding planned contents, for scheduling a message for transmission to the ESL for updating only the number of said registers to include the corresponding planned contents from the third data image.

7. The system of claim 6, wherein the computer is also for receiving an indication that an update to one or more of said registers may be necessary.

8. The system of claim 6, wherein the computer is also for reading the first data image from current ESL data.

9. The system of claim 6, wherein the computer is also for reading the second data image from product data.

* * * * *